(12) United States Patent
Haddadi

(10) Patent No.: US 9,529,212 B2
(45) Date of Patent: Dec. 27, 2016

(54) METHOD AND DEVICE FOR DETERMINING AT LEAST ONE CUSTOMIZED ADJUSTMENT PARAMETER OF A LENS CARRIED BY A SPECTACLES FRAME FACING THE EYE OF A WEARER

(75) Inventor: Ahmed Haddadi, Charenton le Pont (FR)

(73) Assignee: ESSILOR INTERNATIONAL (COMPAGNIE GENERALE D'OPTIQUE), Charenton le Pont (FR)

( * ) Notice: Subject to any disclaimer, the term of this patent is extended or adjusted under 35 U.S.C. 154(b) by 451 days.

(21) Appl. No.: 14/118,645

(22) PCT Filed: May 16, 2012

(86) PCT No.: PCT/FR2012/000200
§ 371 (c)(1),
(2), (4) Date: Nov. 19, 2013

(87) PCT Pub. No.: WO2012/160273
PCT Pub. Date: Nov. 29, 2012

(65) Prior Publication Data
US 2014/0218679 A1   Aug. 7, 2014

(30) Foreign Application Priority Data

May 23, 2011   (FR) ...................................... 11 01584

(51) Int. Cl.
*G02C 13/00*   (2006.01)
(52) U.S. Cl.
CPC .................................. *G02C 13/005* (2013.01)
(58) Field of Classification Search
CPC ......... A61B 3/11; A61B 3/111; G02C 13/003; G02C 13/005

USPC ........................... 351/204, 246, 178; 33/200
See application file for complete search history.

(56) References Cited

U.S. PATENT DOCUMENTS

| 7,909,460 B1 | 3/2011 | Wada |
| 2003/0090625 A1 | 5/2003 | Izumitani |
| 2010/0128220 A1* | 5/2010 | Chauveau ............... A61B 3/111 351/204 |

FOREIGN PATENT DOCUMENTS

EP   2 233 066   9/2010

OTHER PUBLICATIONS

International Search Report dated Jul. 31, 2012 in corresponding PCT application.

* cited by examiner

*Primary Examiner* — Huy K Mai
(74) *Attorney, Agent, or Firm* — Young & Thompson

(57) ABSTRACT

A method for evaluating at least one individualized fitting parameter for a lens mounted in a spectacle frame. The method includes the following steps: (a) evaluating a postural parameter of the wearer of the spectacle frame in a vision posture, the postural parameter being selected from a plurality of preset postural parameters; (b) evaluating a second pantoscopic angle formed between, on the one hand, the projection of the temple of the frame onto the sagittal plane of the wearer, and on the other hand, the trace, on the same plane, of the front side of the frame; and (c) evaluating the first pantoscopic angle as a function of, on the one hand, the second pantoscopic angle evaluated in step (b), and on the other hand, the postural parameter of the wearer evaluated in step (a).

4 Claims, 2 Drawing Sheets

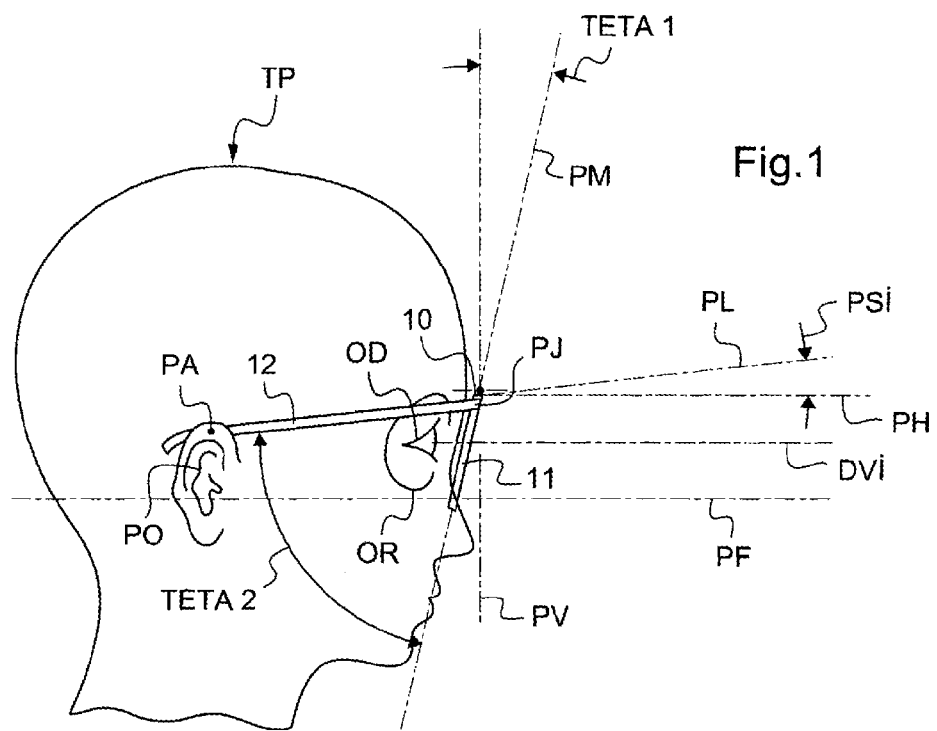
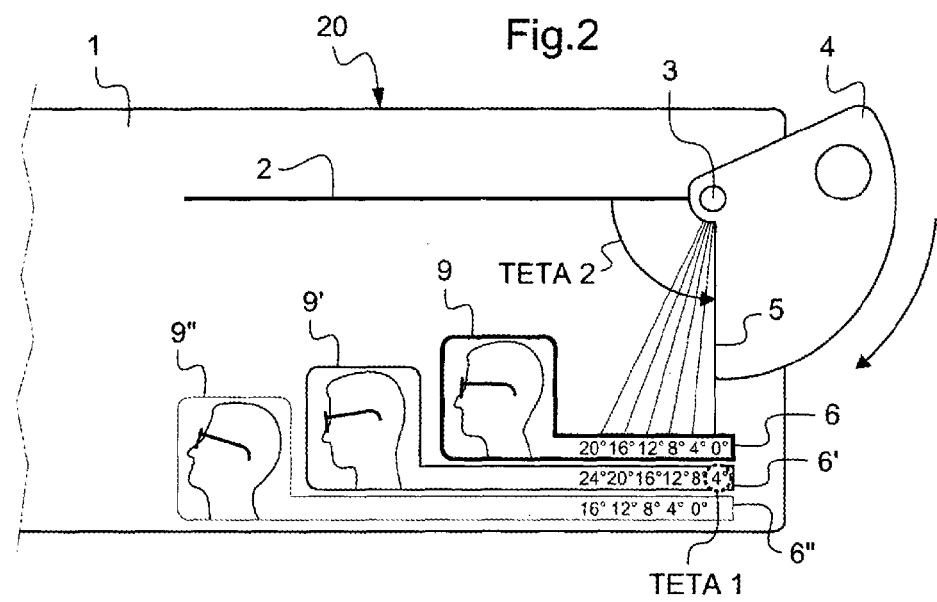

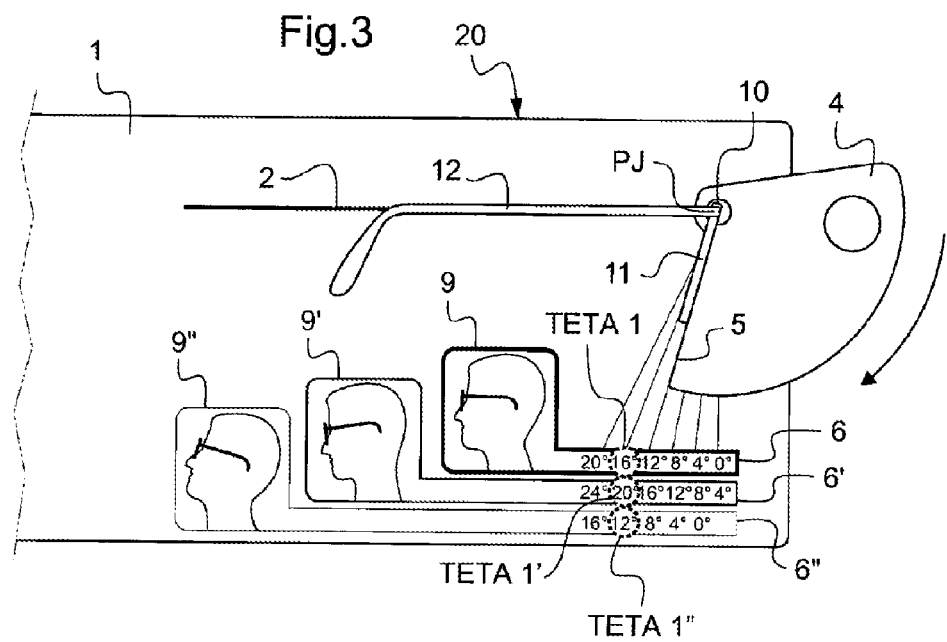

METHOD AND DEVICE FOR DETERMINING AT LEAST ONE CUSTOMIZED ADJUSTMENT PARAMETER OF A LENS CARRIED BY A SPECTACLES FRAME FACING THE EYE OF A WEARER

TECHNICAL FIELD OF THE INVENTION

Generally, the present invention relates to the field of the individualization of corrective spectacle glasses.

It more particularly relates to a method and device for determining at least one individualized fitting parameter for a lens mounted in a spectacle frame facing the eye of a wearer.

In particular, it relates to a simple and economical method and device for measuring what are called "glazing" parameters i.e. parameters intended to allow corrective lenses to be fitted into and centered on a frame chosen by a spectacle wearer, in a way that allows the required optical correction to be achieved.

PRIOR ART

Various methods and devices for fitting a lens into a spectacle frame taking account of the morphology of the spectacle wearer and the shape and size of the spectacle frame are known.

It is desired, in the context of glazing ophthalmic vision-correcting lenses into a spectacle frame, to take better account of the individual geometric/postural parameters of the wearer, and of the frame they have chosen.

The geometric/postural parameters sought are related to the geometry of the head of the wearer and to the chosen spectacle frame, and to the posture of the wearer. They especially comprise the spatial configuration of each lens relative to the head of the wearer, under the conditions encountered when the wearer is wearing the frame equipped with its lenses. The frame is a display frame or the final frame fitted with prescription glasses for inspection. This spatial configuration is especially defined by the pantoscopic angle of each lens when worn (angle that the general plane of the lens forms relative to the vertical) and the height of the eyes of the wearer relative to the lower edge of the lens.

To evaluate this spatial configuration, the optician places a pair of display spectacles on the nose of the wearer. The display spectacles have the frame chosen by the wearer and non-corrective lenses glazed into the rims of the frame.

The height of the eyes of the wearer relative to the lower edge of the frame may be measured manually: the optician observes the wearer from in front and performs an approximate measurement, by means of a rule, of the distance between the pupil of an eye and the lower edge of the display lens. The optician may also approximate the pantoscopic angle between the holding plane PM of the lens and a vertical plane using means specific to each operator. However, to measure these geometric/postural parameters, an operator approaches and applies a measuring tool to the frame of the wearer, which may cause the wearer to involuntarily modify their natural posture. Lastly, this measurement is not very ergonomic for the operator.

It has been proposed to automate the evaluation of these geometric/postural parameters by performing the evaluation using one or more images taken of the wearer wearing the chosen spectacle frame. These images are processed to evaluate the parameters sought.

However, these methods for evaluating the geometric/postural parameters of the wearer have the drawback of being very imprecise. Specifically, in order for the measurement to be precise, it is necessary for the head of the wearer to be in its natural distance-vision posture at the moment of the measurement, i.e. when the wearer, free from any constraint, gazes into the distance with their head in its natural position.

There is a need for individualized fitting of lenses into spectacle frames to take into account a greater number of parameters: not only the morphology of the face of the wearer and the precise shape of the chosen frame, but also parameters relating to the use of the spectacles by the wearer, such as their natural distance-vision posture with spectacles.

SUBJECT OF THE INVENTION

For this purpose, the present invention relates to a method for evaluating at least one individualized fitting parameter for a lens mounted in a spectacle frame facing the eye of a wearer, said spectacle frame comprising at least one temple and means for holding at least one lens in a holding plane. The individualized fitting parameter comprises a first pantoscopic angle formed between the holding plane and the vertical in the vision posture of the wearer.

The method comprises the following steps:

(a) evaluating a postural parameter of the wearer of the spectacle frame in a vision posture, said postural parameter being selected from a plurality of preset postural parameters;

(b) evaluating a second pantoscopic angle formed between, on the one hand, the projection of the temple of said frame onto the sagittal plane of the wearer, and on the other hand, the trace, on the same plane, of the front side of said frame; and (c) evaluating said first pantoscopic angle as a function of, on the one hand, the second pantoscopic angle evaluated in step (b), and on the other hand, the postural parameter of the wearer evaluated in step (a).

The following are other nonlimiting and advantageous features of the method according to the invention:

- the postural parameter is evaluated in step (a) by determining the angle formed between a horizontal plane and a temple of the spectacle frame in the vision posture of the wearer;
- the postural parameter is evaluated in step (a) by identifying the vision posture of the wearer and comparing it to one of the following postures: head horizontal, head lowered and inclined forward, or head raised and inclined backward;
- in step (c) the first pantoscopic angle is evaluated by summing the second pantoscopic angle and a preset correction angle that depends on the postural parameter evaluated in step (a);
- a first correction angle associated with a first postural parameter, and at least one second correction angle associated with a second postural parameter are evaluated;
- step (b) comprises a graphical evaluation of a projection of the second pantoscopic angle, the evaluation of the postural parameter of the wearer in step (a) allows a preset reading nomogram to be selected depending on the vision posture of the wearer, and step (c) comprises a step of reading the projection of the second pantoscopic angle onto said preset nomogram in order to obtain the first pantoscopic angle of the wearer in their vision posture; and
- said postural parameter of the wearer evaluated in step (a) is a function of the sum of an angle of inclination of the head of the wearer about a horizontal axis of rotation and an angle of inclination of the body of the wearer about a horizontal axis of rotation.

The invention also relates to a device for evaluating at least one individualized fitting parameter for a lens mounted in a spectacle frame facing the eye of a wearer, said spectacle frame comprising at least one temple and means for holding at least one lens in a holding plane. The fitting parameter comprises a first pantoscopic angle formed between the holding plane and the vertical in the vision posture of the wearer.

The measuring device comprises a flat supporting member containing a mark taking the form of a line segment, and a flat protractor rotatably mounted about a rotation axis cutting the straight line of the line segment forming the mark, so that said protractor is able to rotate in a plane parallel to the flat supporting member, said protractor comprising at least one visual radial marker passing through the rotation axis and designed to be aligned with the holding plane of the spectacle frame when the spectacle frame is placed on said flat supporting member, a temple being aligned with the mark of the flat supporting member, and the end of the temple proximal the holding plane of the frame being placed next to the rotation axis so that the angle formed between the mark of the flat supporting member and the radial marker corresponds to a second pantoscopic angle formed between, on the one hand, the projection of the temple of said frame onto the sagittal plane of the wearer, and on the other hand, the trace, on the same plane, of the front side of said frame, and said flat supporting member comprises a plurality of graduated scales, each graduated scale being associated with a preset postural parameter, the position of the radial marker relative to a graduated scale allowing said first pantoscopic angle to be read directly.

The following are other nonlimiting and advantageous features of the device according to the invention:
- said flat supporting member comprises a first graduated scale associated with a first preset postural parameter for which the first pantoscopic angle is equal to the second pantoscopic angle, and at least one second graduated scale associated with a second preset postural parameter, the graduations of said second scale being offset by a preset correction angle relative to said first scale;
- said flat supporting member is formed from a transparent plastic sheet and in which the measurement scales are printed in a combination of four colors, each color being associated with a preset postural parameter of the wearer of the spectacle frame in a vision posture; and
- said flat supporting member furthermore comprises means for measuring inter-pupil distances, means for measuring pupil height, means for measuring a warp/curvature angle of the frame and/or means for measuring the distance between the eye of the wearer and the back side of the lens.

DETAILED DESCRIPTION OF AN EXAMPLE EMBODIMENT

The following description, given with regard to the appended drawings, by way of nonlimiting example, will allow what the invention consists of and how it can be carried out to be understood.

In the appended drawings:

FIG. 1 is a side view of the head of a wearer wearing display spectacles;

FIG. 2 is a front view of a measuring device according to one embodiment of the invention;

FIG. 3 is a front view of the measuring device in FIG. 2, on which a spectacle frame is placed;

FIG. 1 shows a side view of the head of a wearer TP wearing display spectacles. The wearer is wearing a frame 10 that they chose beforehand and into which lenses having a vision-correcting optical function corresponding to a prescription will be glazed. This frame 10 conventionally comprises two rims 11 connected by a nose bridge, and two temples 12.

As shown in FIG. 1, the Frankfurt plane PF is defined as the plane passing through the inferior orbital margins OR and the porion PO of the wearer, the porion being the highest point in the skull of the ear canal, which corresponds to the tragion TR of the ear, i.e. the highest point of the tragus of the ear.

A median or sagittal plane PSAG of the head of the wearer TP is also defined parallel to the plane of the FIG. 1. The sagittal plane PSAG or vertical median plane of the head of the wearer is the plane orthogonal the Frankfurt plane PF passing through the middle of the two centers of rotation CROD, CROG of the eyes OD (for right eye) and OG (for left eye).

Each rim 11 of the frame lies in a holding plane PM that, seen from the side, forms, with a vertical plane PV, a vertical angle of inclination TETA1 about a horizontal direction perpendicular to the sagittal plane PSAG. In the present document, this angle TETA1 is called the first pantoscopic angle.

Furthermore, the longitudinal axis of a temple 12 is defined as being a straight line passing, on the one hand, through the point PA where a spectacle temple rests on the ear of the wearer, and on the other hand, through the point PJ where the temple 12 joins the spectacle frame 10. The expression "longitudinal plane PL" is understood to mean a plane perpendicular to the sagittal plane PSAG and containing a longitudinal axis of a temple 12 of a frame 10. The longitudinal plane PL makes an angle PSI to a horizontal plane PH.

A second pantoscopic angle TETA2 is defined in the present document, this angle TETA2 being formed between the holding plane PM and the longitudinal plane PL (defined above) which comprises the longitudinal axis of a temple 12 of the frame 10.

An observation forming part of the present invention is that one of the difficulties with measuring the pantoscopic angle of a lens relative to the vertical when the spectacle wearer is looking into the distance results in part from the first pantoscopic angle TETA1, which is the angle sought, and the second pantoscopic angle TETA2, being confused. Furthermore, the natural distance-vision posture of a wearer wearing corrective lenses does not always correspond to their posture during measurement of the geometric/morphological fitting parameters. This posture difference between the posture adopted during the measurement of the geometric/anatomical parameters and the natural distance-vision posture of the wearer may especially lead to an offset between the optical center of the lens in the frame and the height position of the vision line DVI of the wearer in their natural distance-vision posture. However, it is essential for lenses to be centered if the prescribed correction is to be obtained. An offset between the gaze center and the center of the lens in natural distance-vision position is liable to generate discomfort or even result in the vision of the wearer being poorly corrected.

The optician generally evaluates the geometric/postural parameters of the wearer after the wearer has adopted a certain anatomical posture. In order to measure their geometric/postural parameters, it is generally recommended for the wearer to place their head in the posture where their Frankfurt plane is horizontal.

Thus, in FIG. 1, the wearer has adopted a natural sitting or standing posture configuration, i.e. the Frankfurt plane PF of the head of the wearer is substantially horizontal. In this position, the gaze axis or line of sight DV of the wearer is initially the horizontal primary gaze axis DVI, and corresponds to the case where the wearer gazes at the horizon straight in front of them at infinity.

FIG. 1 only shows the head of the wearer. On the one hand, the vision posture of the wearer depends on a first angle of inclination of the head of the wearer in the sagittal plane relative to their body, this first angle of inclination being related to a rotation of the head of the wearer about a horizontal axis perpendicular to the sagittal plane PSAG of the head of the wearer. On the other hand, the posture of the wearer depends on a second angle of inclination of the body of the wearer in a vertical plane forward or backward, this second angle of inclination of the body corresponds to a rotation of the body of the wearer about a horizontal axis. The vision posture of the wearer is a function of the sum of the angle of inclination of the head of the wearer and the angle of inclination of the body. Therefore, the first pantoscopic angle TETA1 also generally depends on the sum of the angle of inclination of the head of the wearer and of the angle of inclination of the body since the inclination of the mean plane PM of the rims of the frame follows that of the head.

However, the posture adopted during the measurement, for example facing an operator, does not always correspond to the posture the wearer adopts under the usual conditions they encounter when wearing their spectacles. Specifically, the posture where the Frankfurt plane of the wearer is horizontal corresponds to the orthostatic position in which, for a large part of the population but not all spectacle wearers, the minimum amount of effort is made by the wearer. However, it has been observed that certain wearers have a natural distance-vision posture in which their head is inclined forward by a mean angle of about 4 degrees. Other wearers have a natural distance-vision posture in which their head is inclined backward by a mean angle of about −4 degrees.

Differences between the cephalic posture of the wearer during measurement and during subsequent use of the spectacles by the wearer modify the first pantoscopic angle TETA1, and are liable to result in an error in the measurement of pupil height, and in the lenses being decentered relative to the line of sight DV of the wearer.

Device

FIG. 2 schematically shows a front view of a measuring device 20 according to one particular embodiment of the invention. The device 20 in FIG. 2 comprises a flat supporting member 1, for example made of a transparent plastic, on which a mark 2, taking the form of a line segment, appears. The flat supporting member 1 comprises a plurality of graduated scales 6, 6', 6" each graduated scale being associated with a preset postural parameter 9, 9', 9", respectively. In the example shown in FIG. 2, a first postural parameter 9 corresponds to a vision posture in which the head of the wearer is horizontal; a second postural parameter 9' corresponds to a vision posture in which the head of the wearer is lowered or inclined forward; and a third postural parameter 9" corresponds to a vision posture in which the head of the wearer is raised or inclined backward. The device 20 in FIG. 2 also comprises a flat protractor 4 rotatably mounted about a rotation axis 3 cutting the straight line of the line segment forming the mark 2 so that said protractor 4 is able to rotate in a plane parallel to the flat supporting member 1. The protractor 4 comprises a visual radial marker 5 passing through the rotation axis 3, represented, for example, by the edge of the protractor 4 in FIG. 2. Depending on the angular orientation of the protractor 4, the visual radial marker 5 indicates a direction that corresponds to a different graduation on the first graduated scale 6, on the second graduated scale 6', and on the third graduated scale 6", respectively.

In a preferred embodiment, the graduated scales 6, 6' and 6" are printed in four colors in order to enable rapid identification.

FIG. 3 schematically shows a front view of the measuring device in FIG. 2, on which device a spectacle frame has been placed on its temple 12, the frame here being seen from the side. More precisely, the spectacle frame is placed on the flat supporting member 1, the longitudinal axis of a temple 12 being aligned with the mark 2 on the flat supporting member 1, and the end of the temple proximal the holding plane PM being placed next to the axis of rotation 3 of the protractor 4. One temple 12 of the spectacles and the trace of the front side of the frame on the plane of the supporting member 1 may be seen in FIG. 3.

Method

A method for evaluating the first pantoscopic angle TETA1 by means of the device shown in FIG. 3 will now be described. The operator places the frame on the supporting member 1 and aligns the frame on the supporting member 1 as indicated above with regard to FIG. 3. The operator keeps the frame in this position while orienting the protractor 4 in order to align the radial marker 5 with the trace of the front side of the frame on the plane of the supporting member 1, in other words while aligning the visual marker 5 with the projection of the rims 11 onto the plane of the supporting member 1. The angle formed between the mark 2 of the flat supporting member 1 and the visual marker 5 then corresponds to the second pantoscopic angle TETA2 formed between, on the one hand, the projection of the temple 12 of the frame onto the sagittal plane of the wearer, and on the other hand, the front side of the frame.

To evaluate the first pantoscopic angle TETA1 corresponding to the vision posture of the wearer, the operator identifies the natural distance-vision posture of the wearer and compares it to one of the preset postures: head horizontal 9, head lowered and inclined forward 9', or head raised and inclined backward 9". By way of this comparison, the operator deduces the graduated scale 6', 6 or 6" to be used. The intersection of the radial marker and the graduated scale associated with the natural distance-vision posture of the wearer directly indicates the first pantoscopic angle TETA1. In the example in FIG. 3, if the wearer has a vision posture corresponding to type 9, the angle TETA1 is read from scale 6. In the case where the wearer has a vision posture corresponding to type 9', the angle TETA1' is read from scale 6'. Respectively, in the case where the wearer has a vision posture corresponding to type 9', the angle TETA1' is read from scale 6".

The natural distance-vision posture of the wearer may for example be identified beforehand by estimating the angle of inclination PSI of a spectacle temple 12 relative to a horizontal plane PH. It is thus possible to select the natural vision posture of the wearer from three vision postures: head horizontal, head lowered, or head raised.

Advantageously, the device 20 not only comprises a tool for measuring the first pantoscopic angle TETA1, but also various tools for measuring a number of individual geometric/postural parameters.

In one particular embodiment, the flat supporting member 1 of the device furthermore comprises various rulers intended to measure various geometric/postural parameters. For example, the supporting member may comprise a ruler for measuring inter-pupil distance and/or another ruler for measuring pupil height or even the distance between the vertex of the eye of the wearer and the back side of a lens.

Additionally, the measuring device such as shown in FIG. 3 may furthermore comprise a nomogram intended to measure the curvature angle or camber of a spectacle frame, when the frame is placed, resting on its rims 11, on this nomogram.

The flat supporting member 1 advantageously comprises a transparent etched plastic rule with black and white zones for measuring pantoscopic angle. The protractor 4 is preferably a semicircle that can be rotated in order to align the latter with the front side of the frame after the temple of said frame has been placed on the printed marker. Likewise, the protractor 4 is advantageously made of a transparent plastic. The graduated measurement scales 6, 6', 6'' of the first pantoscopic angle TETA1.

In another embodiment of the invention, the postural parameter of the wearer corresponds to various postures of the wearer such as the posture adopted when sitting, standing or even a near-vision posture (at home in front of the television, a computer screen or telephone, or when driving). In another embodiment of the invention, the postural parameter of the wearer corresponds to various sizes or ages (child, adult, old person, etc.).

The invention provides a simple and economical device that allows what are called "glazing" parameters to be measured, and in particular the first pantoscopic angle TETA1, which is highly influenced by the behavior of the spectacle wearer, especially how they hold their head when gazing into the distance.

The invention allows the measurement of the pantoscopic angle of the wearer to be improved by providing a means for embodying a transfer function between, on the one hand, the first pantoscopic angle TETA1 related to the lens and to the vision posture of the wearer, and on the other hand, the second pantoscopic angle TETA2 relating to the frame. In addition, the device of the invention provides a nomogram of the correspondence between the first and second pantoscopic angles.

In one particular embodiment, two different graduated scales of the first pantoscopic angle TETEA1 are offset relative to a standard graduated scale TETA1 by an angle of + or −4°, respectively, depending on how of the wearer holds their head. The device then comprises a nomogram for reading the first pantoscopic angle TETA1, offset by + or −4°, respectively, depending on how the wearer holds their head.

Furthermore, basing the measuring device on a transfer function between a measured angle and the angle sought makes it possible to make the device more ergonomic to use. Specifically, during measurement there is no contact between the operator and the wearer, and therefore the wearer does not change their natural posture. The device and the method limit the effects of parallax between the front side of the frame and the printed indices allowing this angle to be measured.

The method and the device of the invention allow the absolute pantoscopic angle TETA1, which takes into account both the spectacle frame chosen by the wearer and at least one postural parameter of the wearer, such as, for example, their natural distance-vision posture, to be evaluated.

The invention claimed is:

1. A device for evaluating at least one individualized fitting parameter for a lens mounted in a spectacle frame facing the eye of a wearer, said spectacle frame comprising at least one temple and means for holding at least one lens in a holding plane, characterized in that:
said fitting parameter comprises a first pantoscopic angle TETA1 formed between the holding plane and the vertical in the vision posture of the wearer;
and in that a measuring device comprises:
a flat supporting member containing a mark taking the form of a line segment;
a flat protractor rotatably mounted about a rotation axis cutting the straight line of the line segment forming the mark, so that said protractor is able to rotate in a plane parallel to the flat supporting member, said protractor comprising at least one visual radial marker passing through the rotation axis and designed to be aligned with the holding plane of the spectacle frame when the spectacle frame is placed on said flat supporting member, a temple being aligned with the mark of the flat supporting member, and the end of the temple proximal the holding plane of the frame being placed next to the rotation axis so that the angle formed between the mark of the flat supporting member and the radial marker corresponds to a second pantoscopic angle TETA2 formed between, on the one hand, the projection of the temple of said frame onto the sagittal plane of the wearer, and on the other hand, the trace, on the same plane, of the front side of said frame; and
said flat supporting member comprises a plurality of graduated scales, each graduated scale being associated with a preset postural parameter, the position of the radial marker relative to a graduated scale allowing said first pantoscopic angle TETA1 to be read directly.

2. The measuring device as claimed in claim 1, in which said flat supporting member comprises a first graduated scale associated with a first preset postural parameter for which the first pantoscopic angle is equal to the second pantoscopic angle TETA2, and at least one second graduated scale associated with a second preset postural parameter, the graduations of said second scale being offset by a preset correction angle relative to said first scale.

3. The measuring device as claimed in claim 1, in which said flat supporting member is formed from a transparent plastic sheet and in which the graduated measurement scales are printed in a combination of four colors, each color being associated with a preset postural parameter of the wearer of the spectacle frame in a vision posture.

4. The measuring device as claimed in claim 2, in which said flat supporting member is formed from a transparent plastic sheet and in which the graduated measurement scales are printed in a combination of four colors, each color being associated with a preset postural parameter of the wearer of the spectacle frame in a vision posture.

* * * * *